(12) United States Patent
Nakano et al.

(10) Patent No.: US 11,046,183 B2
(45) Date of Patent: Jun. 29, 2021

(54) VEHICLE INTERIOR DISPLAY SYSTEM

(71) Applicant: Yazaki Corporation, Tokyo (JP)

(72) Inventors: Junya Nakano, Shizuoka (JP);
Takayuki Ogawa, Shizuoka (JP); Gosei Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/373,555

(22) Filed: Apr. 2, 2019

(65) Prior Publication Data

US 2019/0299784 A1 Oct. 3, 2019

(30) Foreign Application Priority Data

Apr. 3, 2018 (JP) .............. JP2018-071646
Jan. 21, 2019 (JP) .............. JP2019-007764

(51) Int. Cl.
*B60K 35/00* (2006.01)
*B60W 50/14* (2020.01)
(Continued)

(52) U.S. Cl.
CPC .............. *B60K 35/00* (2013.01); *B60W 50/14* (2013.01); *G02B 5/0825* (2013.01); *G02B 27/0101* (2013.01); *B60K 2370/152* (2019.05); *B60K 2370/1529* (2019.05); *B60K 2370/164* (2019.05); *B60K 2370/166* (2019.05); *B60K 2370/176* (2019.05); *B60K 2370/23* (2019.05); *B60K 2370/334* (2019.05); *B60K 2370/349* (2019.05); *B60K 2370/66* (2019.05); *B60K 2370/785* (2019.05); *B60W 2050/146* (2013.01); *G02B 26/02* (2013.01); *G02B 2027/0118* (2013.01)

(58) Field of Classification Search
CPC .......... G02B 2027/0178; G02B 27/017; H05B 45/10; H05B 45/20; H05B 33/00
See application file for complete search history.

(56) References Cited

U.S. PATENT DOCUMENTS

2008/0218434 A1* 9/2008 Kelly .................... G02B 27/01 345/8
2011/0240834 A1 10/2011 Baudou et al.
(Continued)

FOREIGN PATENT DOCUMENTS

JP H2-57731 U 4/1990
JP H8-175225 A 7/1996
(Continued)

*Primary Examiner* — Samantha (Yuehan) Wang
(74) *Attorney, Agent, or Firm* — Kenealy Vaidya LLP

(57) ABSTRACT

A vehicle interior display system includes: a display device that projects projection light of projection information, and displays the projection information in at least one display region arranged at a position that is visible from the inside of a vehicle compartment; and a control device that controls the display device, and causes the display device to project the projection light. A dimming film that varies light transmittance depending on a voltage value of applied voltage is arranged in the display region or a projection region of a transmitting member for the projection light that is present ahead of a line of sight of an occupant who directs toward the display region in the vehicle compartment.

20 Claims, 13 Drawing Sheets

(51) Int. Cl.
*G02B 5/08* (2006.01)
*G02B 27/01* (2006.01)
*G02B 26/02* (2006.01)

(56) References Cited

U.S. PATENT DOCUMENTS

| | | |
|---|---|---|
| 2016/0178900 A1 | 6/2016 | Kawaguchi |
| 2016/0185219 A1 | 6/2016 | Sakata et al. |
| 2017/0052369 A1 | 2/2017 | Shimatani et al. |
| 2017/0148216 A1 | 5/2017 | Birman et al. |
| 2018/0003966 A1* | 1/2018 | Kilcher .................. G02B 5/208 |
| 2018/0012091 A1* | 1/2018 | Ricci .................... G07C 5/0858 |
| 2018/0188531 A1 | 7/2018 | Dubey et al. |

FOREIGN PATENT DOCUMENTS

| | | |
|---|---|---|
| JP | 2005-184225 A | 7/2005 |
| JP | 2006-142982 A | 6/2006 |
| JP | 2006-248384 A | 9/2006 |
| JP | 2009-78652 A | 4/2009 |
| JP | 2014-26177 A | 2/2014 |
| JP | 2015-69111 A | 4/2015 |
| JP | 2016-38515 A | 3/2016 |
| WO | 2008/109231 A2 | 9/2008 |
| WO | 2015/25350 A1 | 2/2015 |
| WO | 2015/166872 A1 | 11/2015 |
| WO | 2016/207690 A1 | 12/2016 |

\* cited by examiner

VEHICLE INTERIOR DISPLAY SYSTEM

CROSS-REFERENCE TO RELATED APPLICATION(S)

The present application claims priority to and incorporates by reference the entire contents of Japanese Patent Application No. 2018-071646 filed in Japan on Apr. 3, 2018 and Japanese Patent Application No. 2019-007764 filed in Japan on Jan. 21, 2019.

BACKGROUND OF THE INVENTION

1. Field of the Invention

The present invention relates to a vehicle interior display system.

2. Description of the Related Art

In the related art, there is known a vehicle interior display system that displays information in a cabin of a vehicle (vehicle compartment). The vehicle interior display system includes a display device that displays information in a predetermined display region in a vehicle compartment, and a control device that causes the display device to display the information. Such a kind of vehicle interior display system is disclosed in Japanese Patent Application Laid-open No. 2006-142982 and Japanese Patent Application Laid-open No. 2005-184225, for example.

Brightness in the vehicle compartment varies due to influence of brightness or the like outside the vehicle. The variation in the brightness in the vehicle compartment also occurs in the display region and surroundings thereof, so that visibility of the information displayed in the display region is also influenced.

SUMMARY OF THE INVENTION

An object of the present invention is to provide a vehicle interior display system that may improve visibility of information in a display region.

A vehicle interior display system according to one aspect of the present invention includes a display device configured to project projection light of projection information, and display the projection information in at least one display region arranged at a position that is visible from the inside of a vehicle compartment; and a control device configured to control the display device, and cause the display device to project the projection light, wherein a dimming film configured to vary light transmittance depending on a voltage value of applied voltage is arranged in the display region or a projection region of a transmitting member for the projection light that is present ahead of a line of sight of an occupant who directs toward the display region in the vehicle compartment, and the control device includes a dimming controller configured to vary transmittance of the dimming film depending on brightness outside a vehicle so that the projection information displayed in the display region is visible to the occupant in the vehicle compartment.

According to another aspect of the present invention, it is preferable that the vehicle interior display system further includes a detection device for vehicle outside information configured to detect detection information related to the brightness outside the vehicle, wherein the control device includes an estimation unit for vehicle outside information configured to estimate a brightness outside the vehicle based on the detection information of the detection device for vehicle outside information.

According to still another aspect of the present invention, in the vehicle interior display system, it is preferable that the transmitting member is a window glass of the vehicle.

According to still another aspect of the present invention, in the vehicle interior display system, it is preferable that the transmitting member is a windshield of the vehicle.

According to still another aspect of the present invention, in the vehicle interior display system, it is preferable that, in the projection region, a plurality of the dimming films having the same size are arranged to be overlapped with each other, or a plurality of the dimming films having different sizes are arranged to be overlapped with each other so that the number of laminated films increases toward a lower side of the vehicle.

According to still another aspect of the present invention, in the vehicle interior display system, it is preferable that the dimming film is formed so that a thickness of the dimming film increases toward a lower side of the vehicle.

According to still another aspect of the present invention, in the vehicle interior display system, it is preferable that a light reflection film is arranged to be closer to a vehicle interior side than the dimming film in the projection region, the light reflection film in which a dielectric multilayer film as an enhanced reflection film is laminated on a metal reflection film.

According to still another aspect of the present invention, in the vehicle interior display system, it is preferable that the light reflection film transmits the projection light toward the dimming film, and reflects a larger amount of light than the transmitted light toward a vehicle interior side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment of a vehicle interior display system according to the present invention in detail based on the drawings. The present invention is not limited to the embodiment.

Embodiment

The following describes an embodiment of a vehicle interior display system according to the present invention based on FIGS. 1 to 5.

Figure 1:
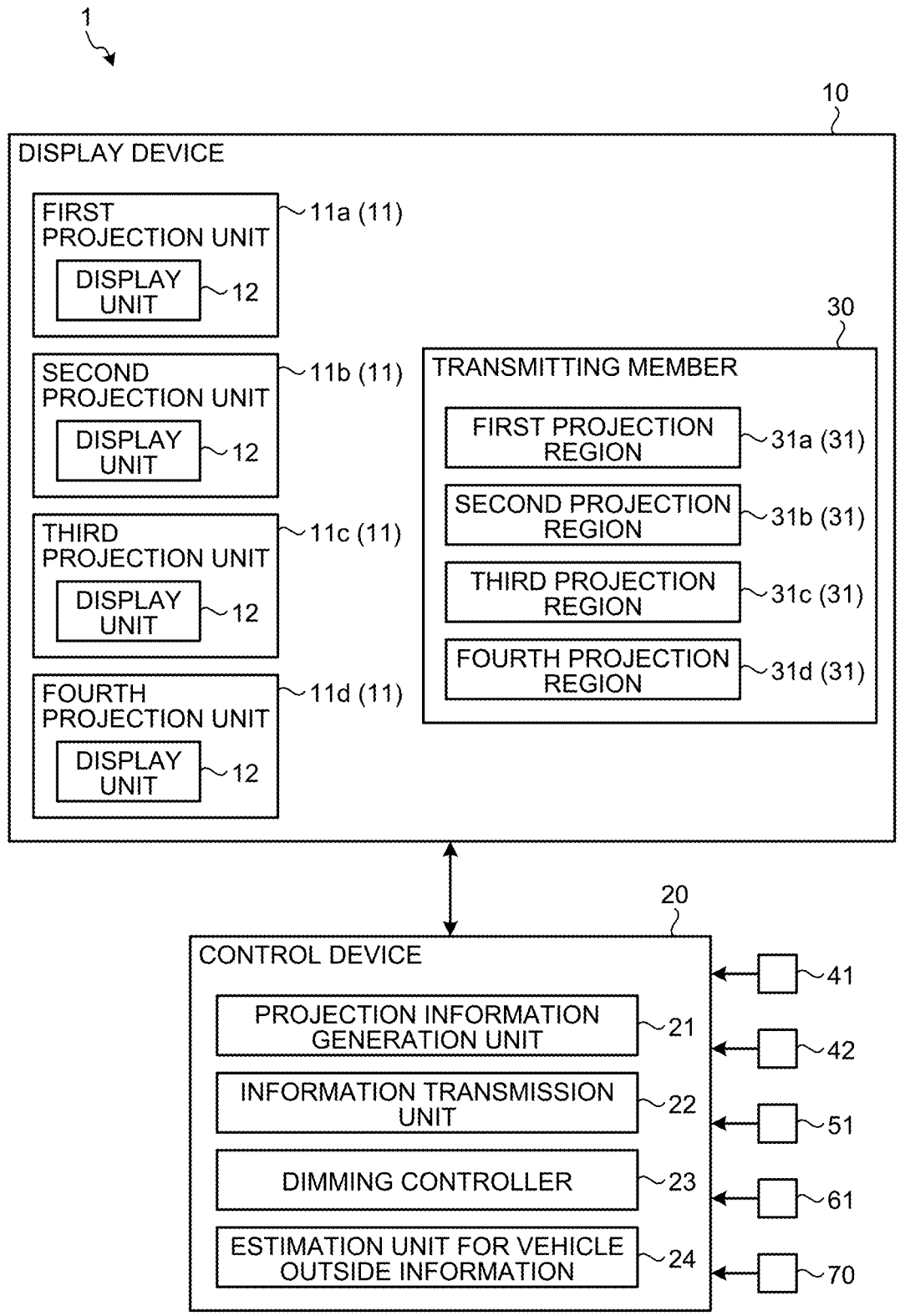
FIG. 1 is a block diagram illustrating a vehicle interior display system according to an embodiment.
Figure 2:
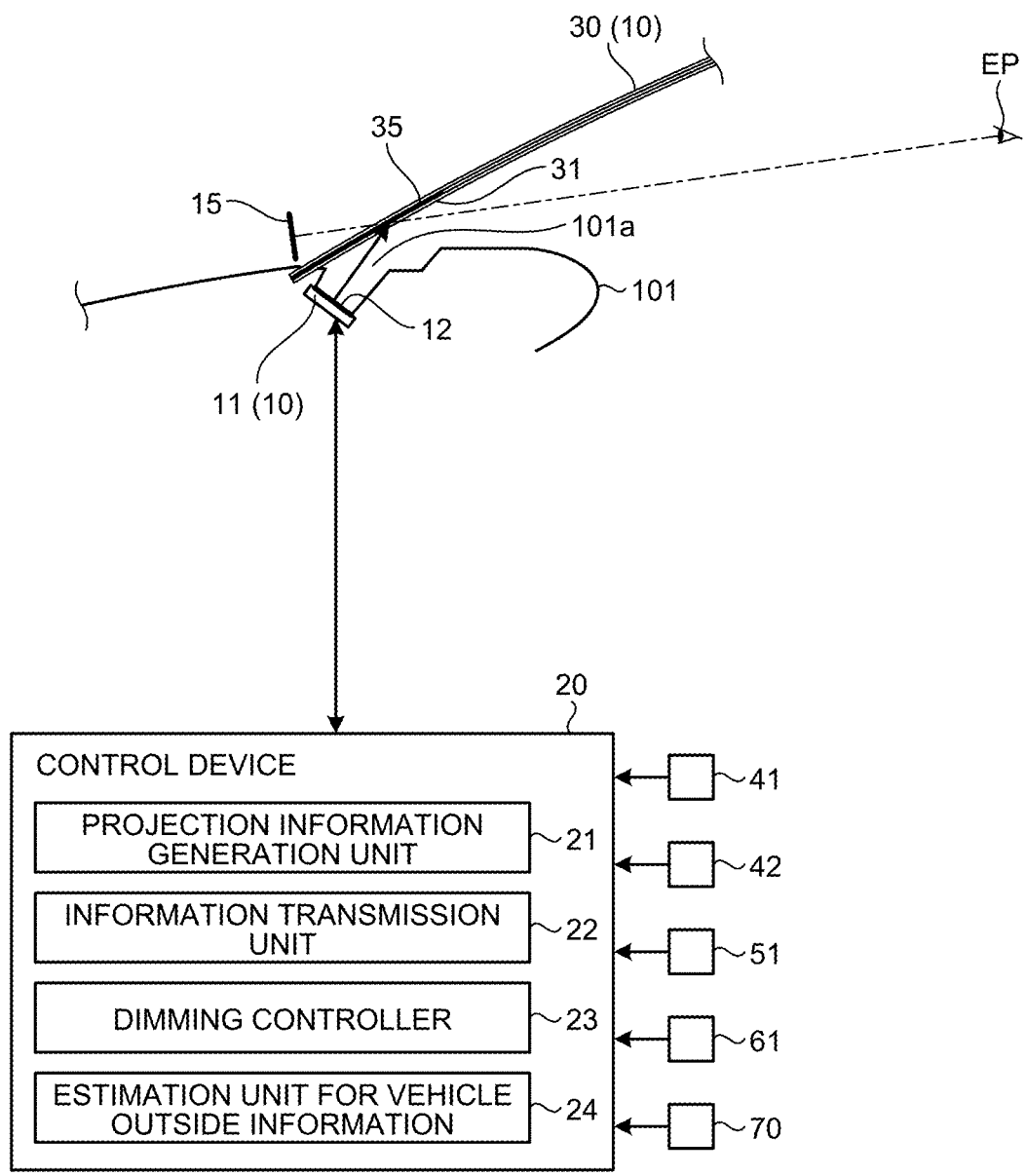
FIG. 2 is a diagram for explaining a configuration example of the vehicle interior display system according to the embodiment.

Reference numeral 1 in FIGS. 1 and 2 denotes a vehicle interior display system according to the present embodiment. First, the following describes an outline of the vehicle interior display system 1. Subsequently, a specific embodiment will be described.

The vehicle interior display system 1 includes a display device 10 and a control device 20.

The display device 10 according to the present embodiment is a device that projects projection light of projection information to display the projection information in at least one display region arranged at a position that is visible from the interior of a vehicle compartment. The control device 20 according to the present embodiment is a device that performs control for causing the display device 10 to display the projection information, and controls the display device 10 to project the projection light of the projection information from this display device 10.

The projection information may be any of character information, mark information such as an icon, image information, moving image information, route guidance information, a TV screen, and the like. The moving image information includes imaging information of an imaging device that images the surroundings of a vehicle (a forward direction of the vehicle, a rearward direction of the vehicle, and the like).

The display device 10 may have a configuration of directly projecting, on a place defined as a display region in the vehicle compartment, the projection light of the projection information to be displayed. In this case, the display device 10 utilizes a wall surface in the vehicle compartment as the display region, and directly projects the projection light of the projection information on the wall surface in the vehicle compartment defined as the display region. For example, in the vehicle compartment, a wall surface of a lining (lining of a pillar, a door, a roof, or the like of the vehicle), a wall surface on a back surface side of a seat, a wall surface of a dashboard, a wall surface of an instrument panel, and the like can be utilized as the display region. The entire surface of each of these wall surfaces may be set as one display region, one section of the entire surface may be set as one display region, or each of a plurality of partitions obtained by partitioning the entire surface or one section may be set as the display region.

In this case, in the display region, arranged is a dimming film the light transmittance of which is varied depending on a voltage value of applied voltage. The transmittance of the dimming film can be optionally varied. For example, the dimming film is attached to a portion defined as the display region on the wall surface in the vehicle compartment and covered from a vehicle interior side, or is interposed between the portion defined as the display region on the wall surface in the vehicle compartment and a transparent outer sheath on the vehicle interior side. The control device 20 controls the display device 10 so that the projection light of the projection information is projected on the display region, and varies the transmittance of the dimming film depending on brightness outside the vehicle so that the projection information in the display region is visible to an occupant in the vehicle compartment. For example, the control device 20 reduces the transmittance of the dimming film as the brightness outside the vehicle increases to improve visibility of the projection information displayed in the display region. Specifically, in a case in which the wall surface in the vehicle compartment defined as the display region has a pale color, the projection information becomes difficult to view as the brightness outside the vehicle increases. However, when the transmittance of the dimming film is reduced, and the color of the display region is varied from a transparent color or a pale color to a deep color, so that the projection information displayed in the display region becomes easy to view.

The display device 10 may have a configuration of projecting the projection light of the projection information on a projection region of a transmitting member that is present ahead of a line of sight of the occupant who directs toward the display region in the vehicle compartment (a line of sight starting from an eye point EP (FIG. 2)), and displaying a virtual image of the projection information in the display region that is present on the back of the projection region. In this case, the display device 10 means a display device of what is called a head-up display system. Thus, in this case, the display region means a display region of a virtual image in the head-up display system. The transmitting member in this case means a member that can transmit the projection light of the head-up display system, and examples thereof include a window glass of the vehicle and a combiner of the head-up display system. The entire surface of the transmitting member may be set as one projection region, one section of the entire surface may be set as one projection region, or each of a plurality of partitions obtained by partitioning the entire surface or one section may be set as the projection region.

In the projection region of the transmitting member for the projection light, arranged is a dimming film the light transmittance of which is varied depending on a voltage value of applied voltage. For example, the dimming film is attached to the projection region of the transmitting member from the vehicle interior side, or inserted in the transmitting member. The control device 20 controls the display device 10 so that the projection light of the projection information is projected on the projection region, and varies the transmittance of the dimming film depending on the brightness outside the vehicle so that the projection information displayed in the display region is visible to the occupant in the vehicle compartment. For example, the control device 20 reduces the transmittance of the dimming film as the brightness outside the vehicle increases to vary the color of the projection region from a transparent color or a pale color to a deep color, so that a background of the projection region becomes difficult to view. In this way, the control device 20 makes the projection information displayed in the display region easy to view, so that visibility of the projection information improves. Additionally, in a case in which the projection region is arranged in a portion (one section) of the transmitting member, the control device 20 reduces the transmittance of the dimming film as the brightness outside the vehicle increases to vary the color of the projection region from a transparent color or a pale color to a deep color, and enhances contrast between the projection region and a background in the rear of the transmitting member around the projection region. In this way, the control device 20 makes the projection information displayed in the display region easy to view, so that visibility of the projection information improves. On the other hand, the control device 20 increases the transmittance of the dimming film as the brightness outside the vehicle decreases to vary the color of the projection region from a deep color to a transparent color or a pale color. For example, the increased transmittance makes the background of the projection region easy to view at the time when the projection information is not displayed, so that a field of vision of the occupant can be widened.

Subsequently, the following describes a specific embodiment of the vehicle interior display system 1.

Figure 3:
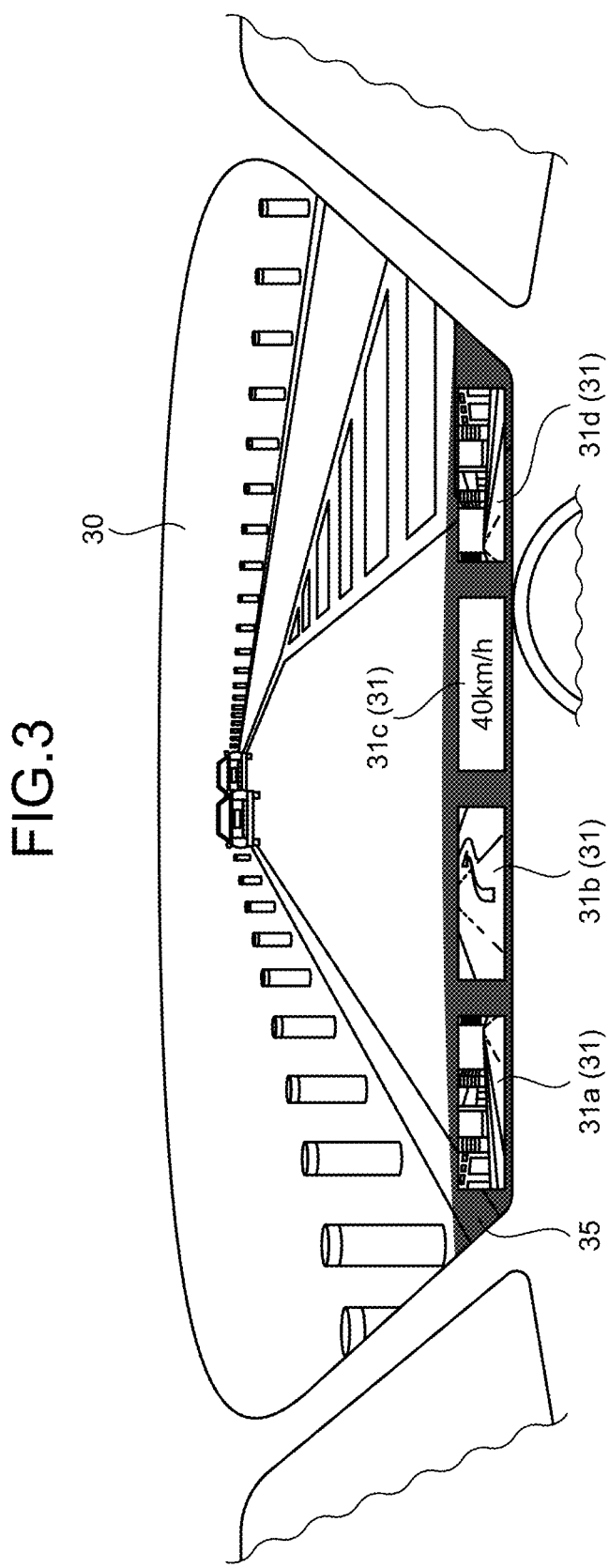
FIG. 3 is a diagram illustrating an example of vehicle interior display.

The present embodiment exemplifies the vehicle interior display system 1 configured as the head-up display system. In this example, the display device 10 is caused to display an image of the projection information formed by the control device 20. A transmitting member 30 in this example is a windshield of the vehicle, and a lower side of the vehicle is set as a projection region 31 (FIGS. 1 to 3). In this example, a plurality of projection regions 31 (herein, first to fourth projection regions 31*a* to 31*d*) are arranged side by side in a vehicle width direction (FIGS. 1 and 3). In the display device 10, a first projection unit 11*a* is arranged on a vehicle left side, and a fourth projection unit 11*d* is arranged on a vehicle right side.

The display device 10 includes a projection unit 11 that is caused to project the projection light of the projection information containing the image formed by the control device 20 (FIGS. 1 and 2). The display device 10 includes the projection unit 11 (first to fourth projection units 11*a* to 11*d*) for each of the first to the fourth projection regions 31*a* to 31*d* (FIG. 1).

The projection unit 11 includes a display unit 12 that displays the projection information (FIGS. 1 and 2). The projection unit 11 is embedded in a dashboard 101 in a state in which the display unit 12 thereof faces the projection region 31. The projection unit 11 causes the display unit 12 to display the display image of the projection information to project the projection light of the display image toward the projection region 31 through an opening 101*a* of the dashboard 101 (FIG. 2). In the display device 10, the projection light is transmitted to the outside of the vehicle in the projection region 31, and a virtual image of the display image that is visible to the occupant is formed at a transmission destination. Herein, for convenience, the position at which the virtual image is formed is defined as a display region 15 (FIG. 2).

The control device 20 includes a projection information generation unit 21 that generates the projection information, and an information transmission unit 22 that transmits the generated projection information to the display device 10 (FIGS. 1 and 2). The exemplified control device 20 causes the projection information generation unit 21 to generate display image information of the projection information, and the information transmission unit 22 transmits the display image information to the display device 10. The display device 10 causes the display unit 12 to display a display image based on the display image information.

The projection information generation unit 21 generates the display image information of the projection information to be displayed on the display unit 12 of each of the first to the fourth projection units 11*a* to 11*d*. The following describes an example thereof.

For example, the display unit 12 of the first projection unit 11*a* is caused to display a display image corresponding to mirror information displayed in a left side-mirror. A first imaging device 41 (FIGS. 1 and 2) arranged on the vehicle left side images the surroundings of the vehicle on the vehicle left side and the vehicle rear side, and transmits the imaging information to the control device 20. The projection information generation unit 21 generates display image information of the first projection unit 11*a* based on the imaging information. The control device 20 causes the display unit 12 of the first projection unit 11*a* to display a display image based on the display image information, and projects projection light of the display image on the first projection region 31*a*. Due to this, the virtual image of the display image corresponding to the mirror information of the left side-mirror is formed in the display region 15 as a transmission destination of the projection light (FIG. 2) as if the virtual image were displayed in the first projection region 31*a* that is present ahead of the line of sight of the occupant (FIG. 3).

The display unit 12 of the fourth projection unit 11*d* is caused to display a display image corresponding to mirror information displayed in a right side-mirror. A second imaging device 42 (FIGS. 1 and 2) arranged on the vehicle right side images the surroundings of the vehicle on the vehicle right side and the vehicle rear side, and transmits the imaging information to the control device 20. The projection information generation unit 21 generates display image information of the fourth projection unit 11*d* based on the imaging information. The control device 20 causes the display unit 12 of the fourth projection unit 11*d* to display a display image based on the display image information, and projects projection light of the display image on the fourth projection region 31*d*. Due to this, the virtual image of the display image corresponding to the mirror information of the right side-mirror is formed in the display region 15 as a transmission destination of the projection light (FIG. 2) as if the virtual image were displayed in the fourth projection region 31*d* that is present ahead of the line of sight of the occupant (FIG. 3).

The display unit 12 of the second projection unit 11*b* is caused to display a display image related to display information (route guidance information or the like) of a car navigation system 51 (FIGS. 1 and 2). In this case, for example, the projection information generation unit 21 receives the display information from the car navigation system 51, and generates display image information of the second projection unit 11*b* based on the display information. For example, in this case, the projection information generation unit 21 generates simplified route information such as the next diverging point. The control device 20 causes the display unit 12 of the second projection unit 11*b* to display a display image based on the display image information, and projects projection light of the display image on the second projection region 31*b*. Due to this, the virtual image of the display image related to the display information of the car navigation system 51 is formed in the display region 15 as a transmission destination of the projection light (FIG. 2) as if the virtual image were displayed in the second projection region 31b that is present ahead of the line of sight of the occupant (FIG. 3).

The display unit 12 of the third projection unit 11c is caused to display a display image related to vehicle information (vehicle speed information or the like). In this case, for example, the projection information generation unit 21 receives vehicle speed information from a vehicle speed sensor 61 (FIGS. 1 and 2), and generates display image information of the third projection unit 11c based on the vehicle speed information. The control device 20 causes the display unit 12 of the third projection unit 11c to display a display image based on the display image information, and projects projection light of the display image on the third projection region 31c. Due to this, the virtual image of the display image related to the vehicle speed information is formed in the display region 15 as a transmission destination of the projection light (FIG. 2) as if the virtual image were displayed in the third projection region 31c that is present ahead of the line of sight of the occupant (FIG. 3).

Figure 4:
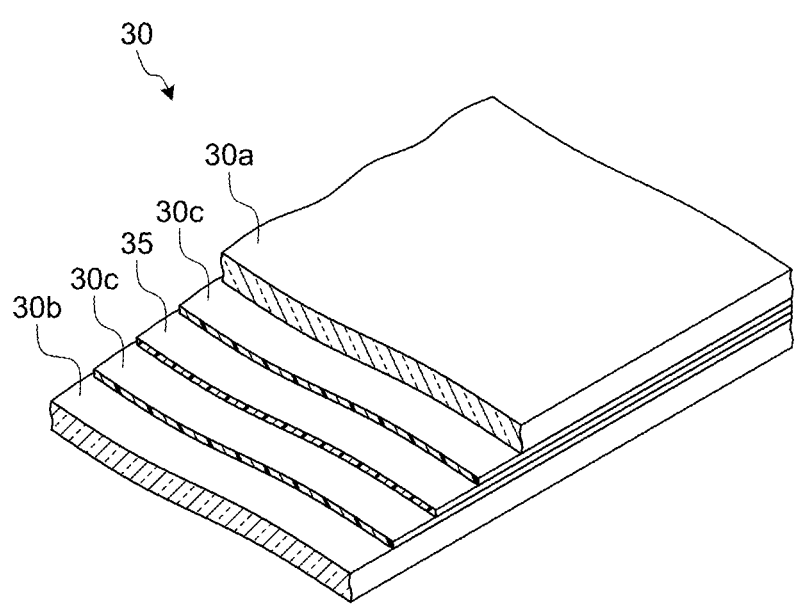
FIG. 4 is a diagram for explaining a transmitting member.

In the vehicle interior display system 1 according to the present embodiment, a dimming film 35 is arranged in the projection region 31 (the first to the fourth projection regions 31a to 31d) (FIGS. 2 and 3). The exemplified transmitting member 30 is what is called laminated glass obtained by arranging two interlayers 30c between two glass plates 30a and 30b, and further interposing the dimming film 35 between the two interlayers 30c (FIG. 4). In this example, the glass plate 30a is arranged on the vehicle interior side, and the glass plate 30b is arranged on a vehicle exterior side.

The dimming film 35 includes a current-carrying member (not illustrated) for applying voltage and a suspended particle device (SPD) layer, and the control device 20 is electrically connected thereto via the current-carrying member. In this example, one dimming film 35 is arranged over all the projection regions 31 (the first to the fourth projection regions 31a to 31d) (FIG. 3). The control device 20 includes a dimming controller 23 that applies voltage to the current-carrying member to vary light transmittance of the dimming film 35 (FIGS. 1 and 2). The dimming controller 23 applies voltage of a voltage value corresponding to target transmittance of the dimming film 35.

The dimming controller 23 varies the transmittance of the dimming film 35 depending on brightness outside the vehicle so that the virtual image of the display image of the projection information formed in the display region 15 is visible to the occupant in the vehicle compartment. The vehicle interior display system 1 according to the present embodiment includes a detection device for vehicle outside information 70 (FIGS. 1 and 2) that detects detection information related to brightness outside the vehicle to grasp the brightness outside the vehicle. The control device 20 includes an estimation unit for vehicle outside information 24 (FIGS. 1 and 2) that estimates the brightness outside the vehicle based on the detection information of the detection device for vehicle outside information 70.

For example, in this case, an imaging device such as a stereo camera is utilized as the detection device for vehicle outside information 70. The detection device for vehicle outside information 70 images peripheral information of the outside of the vehicle (for example, a road, a building, and the like in a vehicle traveling direction), and transmits the imaging information to the control device 20. The estimation unit for vehicle outside information 24 calculates a luminance value for each pixel from the imaging information, and estimates the brightness outside the vehicle based on the luminance value. For example, the estimation unit for vehicle outside information 24 calculates an average value of the luminance values of the pixels, and utilizes the average value as vehicle outside brightness information. The dimming controller 23 calculates the target transmittance of the dimming film 35 based on the vehicle outside brightness information, and varies the transmittance of the dimming film 35 to be the target transmittance. The target transmittance is assumed to be a value with which the virtual image of the display image of the projection information formed in the display region 15 is visible to the occupant in the vehicle compartment. In the vehicle interior display system 1, a correspondence relation between the vehicle outside brightness information and the target transmittance is prepared in advance as map data.

The vehicle outside brightness information may also be acquired by utilizing vehicle-to-vehicle communication or road-to-vehicle communication.

As described above, in the vehicle interior display system 1 according to the present embodiment, the transmittance of the dimming film 35 is varied depending on the brightness outside the vehicle so that the projection information in the display region 15 is visible to the occupant in the vehicle compartment. Thus, the vehicle interior display system 1 can improve visibility of the information (projection information) in the display region 15. For example, the vehicle interior display system 1 according to this specific example can enhance contrast between the projection region 31 and the background of the surroundings thereof, so that visibility of the projection information projected on the projection region 31 is improved in the display region 15. The vehicle interior display system 1 according to the specific example can display more precise projection information in the display region 15 based on a contrast ratio as compared with a system not including the dimming film 35. To the vehicle interior display system 1 according to the specific example, the display device 10 that is inexpensive and has low luminance can be applied because the luminance of the display device 10 is not required to be increased as compared with a system not including the dimming film 35. In the vehicle interior display system 1 according to the specific example, the background of the projection region 31 at the time when the projection information is not displayed becomes easy to view by increasing the transmittance of the dimming film 35 as the brightness outside the vehicle decreases, so that a field of vision of the occupant can be widened.

In the vehicle interior display system 1 according to the specific example, the projection regions 31 (the first to the fourth projection regions 31a to 31d) are arranged side by side in the vehicle width direction, and the one dimming film 35 is arranged over all the projection regions 31. Accordingly, in the vehicle interior display system 1, the transmittance cannot be varied for each projection region 31. Thus, the vehicle interior display system 1 may arrange one dimming film 35 for each projection region 31, and may vary the target transmittance of the dimming film 35 for each projection region 31. For example, in the above description, the target transmittance is calculated by using the vehicle outside brightness information as a parameter, but in the vehicle interior display system 1, the target transmittance may be calculated for each projection region 31 by using, as a parameter, content of the projection information (specifically, luminance or the like) together with the vehicle outside brightness information. Due to this, the vehicle interior display system 1 can obtain a more appropriate contrast ratio corresponding to the content of the projection information, so that visibility of the information (projection information) in the display region 15 can be further improved.

In the example of the vehicle interior display system 1, the projection unit 11 of the display device 10 includes the display unit 12. Alternatively, a light source such as a light-emitting diode may be used as the projection unit 11. For example, in the display device 10, the first projection unit 11a and the fourth projection unit 11d may be used as light sources. Due to this, with the vehicle interior display system 1, when the control device 20 detects another vehicle coming closer thereto from the vehicle left side and the vehicle rear side, the control device 20 can cause the first projection unit 11a to be lit or blink and display emitted light in the first projection region 31a to allow the occupant to recognize the other vehicle. Similarly, with the vehicle interior display system 1, when the control device 20 detects another vehicle coming closer thereto from the vehicle right side and the vehicle rear side, the control device 20 can cause the fourth projection unit 11d to be lit or blink and display emitted light in the fourth projection region 31d to allow the occupant to recognize the other vehicle.

Figure 5:
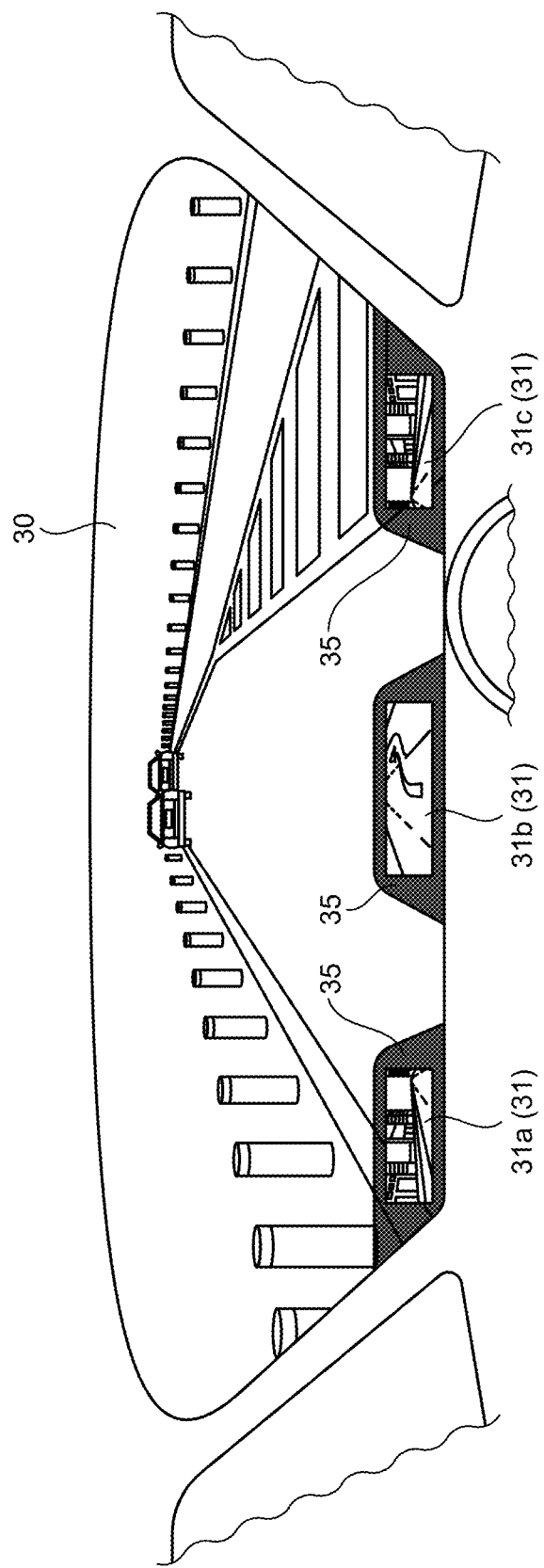
FIG. 5 is a diagram illustrating a variation of the vehicle interior display.

In the vehicle interior display system 1, the projection regions 31 (the first to the third projection regions 31a to 31c) may be arranged at intervals in the vehicle width direction (FIG. 5). In this case, one dimming film 35 is arranged for each projection region 31.

First Modification

In the embodiment described above, the present system is constituted of one dimming film 35. However, for example, a lower limit value (dark state side) of the light transmittance of the dimming film 35 may hardly satisfy a desired value in the present system due to prime cost or the like.

Figure 6:
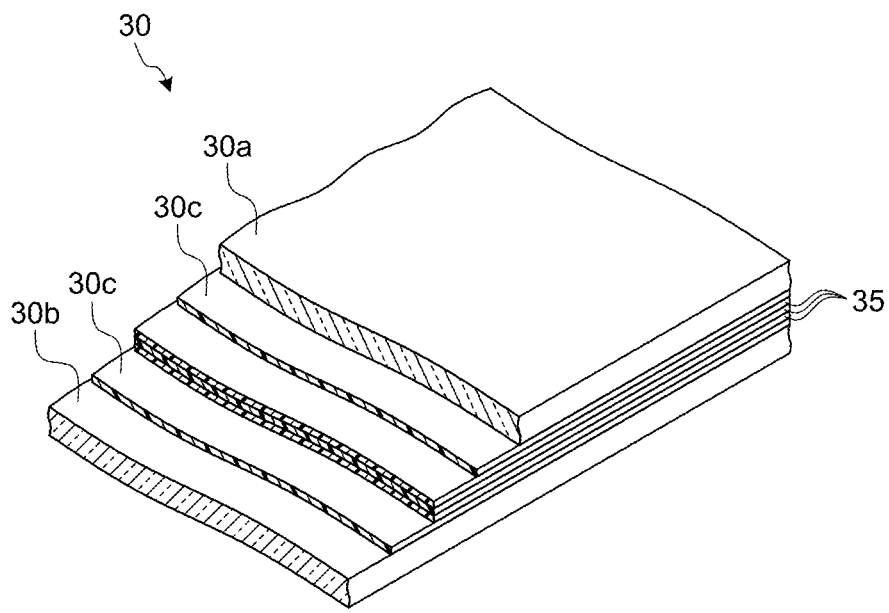
FIG. 6 is a diagram for explaining a transmitting member according to a first modification.

Thus, in the vehicle interior display system 1 according to the present modification, a plurality of dimming films 35 having the same size are arranged to be overlapped with each other in the projection region 31 (FIG. 6). The dimming films 35 are arranged to cover one of, a plurality of, or all of the projection regions 31. The control device 20 is caused to control the transmittance of at least one of the dimming films 35. In this example, three dimming films 35 are laminated.

In the vehicle interior display system 1, the projection region 31 is controlled to have a plurality of kinds of light transmittance. For example, in a case of controlling the projection region 31 to have transmittance of a first dark state in accordance with the brightness outside the vehicle, the control device 20 controls the transmittance of two dimming films 35 to control the projection region 31 to have the transmittance of the first dark state. In a case of controlling the projection region 31 to have transmittance of a second dark state (transmittance lower than the transmittance of the first dark state) in accordance with the brightness outside the vehicle, the control device 20 controls the transmittance of three dimming films 35 to control the projection region 31 to have the transmittance of the second dark state.

In this way, by arranging the dimming films 35, the vehicle interior display system 1 according to the present modification can lower the lower limit value of the light transmittance in the projection region 31 as compared with a case in which the system is constituted of one dimming film 35. Thus, the vehicle interior display system 1 can further improve visibility of the information in the display region, and prime cost of the entire system can be reduced depending on prime cost of one dimming film 35.

Second Modification

Figure 7:
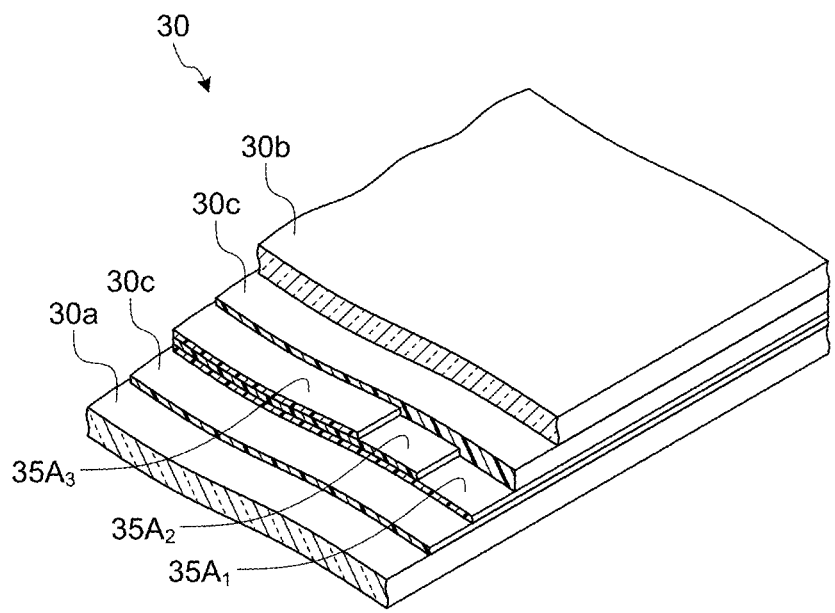
FIG. 7 is a diagram for explaining a transmitting member according to a second modification.

In the first modification described above, the present system is configured by overlapping the dimming films 35 having the same size. In the vehicle interior display system 1 according to the present modification, a plurality of dimming films $35A_n$ (n=1, 2, 3, . . . x) having different sizes are arranged to be overlapped with each other in the projection region 31 so that the number of laminated films increases toward the lower side of the vehicle (FIG. 7). For example, each of the dimming films $35A_n$ is formed in a rectangular shape or a trapezoidal shape having substantially the same size in the vehicle width direction and having different sizes in a vehicle vertical direction. For example, each of the dimming films $35A_n$ is arranged to cover one of, a plurality of, or all of the projection regions 31 with the entire surface of the film, and to vary the number of laminated films on an upper side of the vehicle with respect to the projection region 31. By arranging the individual dimming films $35A_n$ to be closer to the lower side of the vehicle, the dimming films $35A_n$ are stacked in a stepped shape such that the number of laminated films is varied on the upper side of the vehicle with respect to the projection region 31. A gap formed by a level difference of the stepped shape may be filled with the interlayer 30c as a resin sheet, for example.

The control device 20 is caused to control the transmittance of at least one of the dimming films $35A_n$. In this example, three dimming films $35A_1$, $35A_2$, and $35A_3$ are laminated. In this case, the size in the vehicle vertical direction is reduced in order of the dimming films $35A_1$, $35A_2$, and $35A_3$.

In the vehicle interior display system 1, similarly to the first modification, the projection region 31 is controlled to have a plurality of kinds of light transmittance. However, the dimming film $35A_n$ having a smaller size in the vehicle vertical direction is set to be a control object of transmittance according to priority. For example, in a case of controlling the projection region 31 to have the transmittance of the first dark state in accordance with the brightness outside the vehicle, the control device 20 controls the transmittance of the two dimming films $35A_2$ and $35A_3$ to control the projection region 31 to have the transmittance of the first dark state. In a case of controlling the projection region 31 to have the transmittance of the second dark state (transmittance lower than the transmittance of the first dark state) in accordance with the brightness outside the vehicle, the control device 20 controls the transmittance of the three dimming films $35A_1$, $35A_2$, and $35A_3$ to control the projection region 31 to have the transmittance of the second dark state.

In this way, the dimming films $35A_n$ are arranged in the vehicle interior display system 1 according to the present modification, so that the lower limit value of the light transmittance in the projection region 31 can be lowered as compared with a case in which the system is constituted of one dimming film 35, similarly to the first modification. Thus, the vehicle interior display system 1 can further improve visibility of the information in the display region, and the prime cost of the entire system can be reduced depending on the prime cost of one dimming film $35A_n$. Additionally, in the vehicle interior display system 1 according to the present modification, the dimming films $35A_n$ having different sizes are overlapped with each other so as to increase the number of laminated films toward the lower side of the vehicle, so that the light transmittance is increased toward the upper side of the vehicle, at positions at which the number of laminated films is different. Thus, with the vehicle interior display system 1, a boundary between each of the dimming films 35A$_n$ and the surroundings thereof is inconspicuous in the vehicle vertical direction, and fatigue of the occupant's eyes can be relieved when the vehicle vibrates (for example, vertically moves) during traveling, so that visibility of the information in the display region can be further improved.

Third Modification

Figure 8:
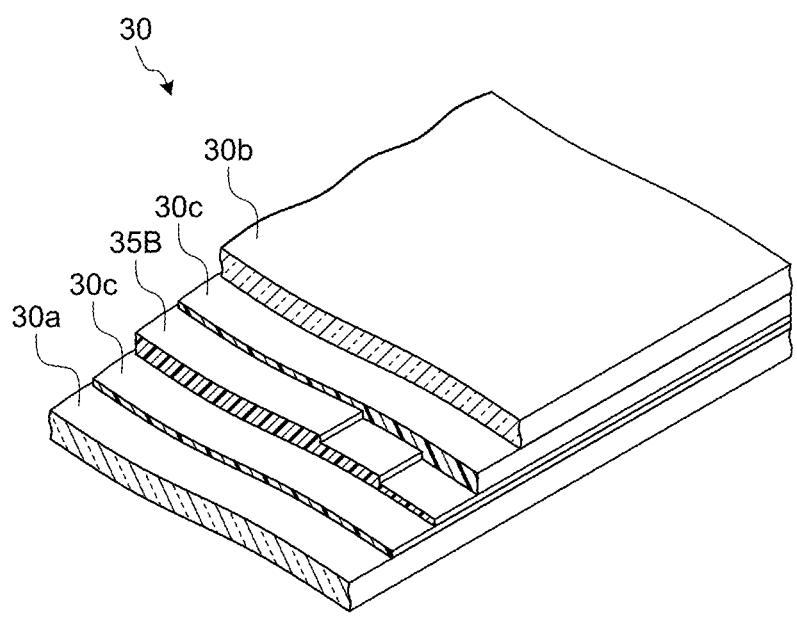
FIG. 8 is a diagram for explaining a transmitting member according to a third modification.
Figure 9:
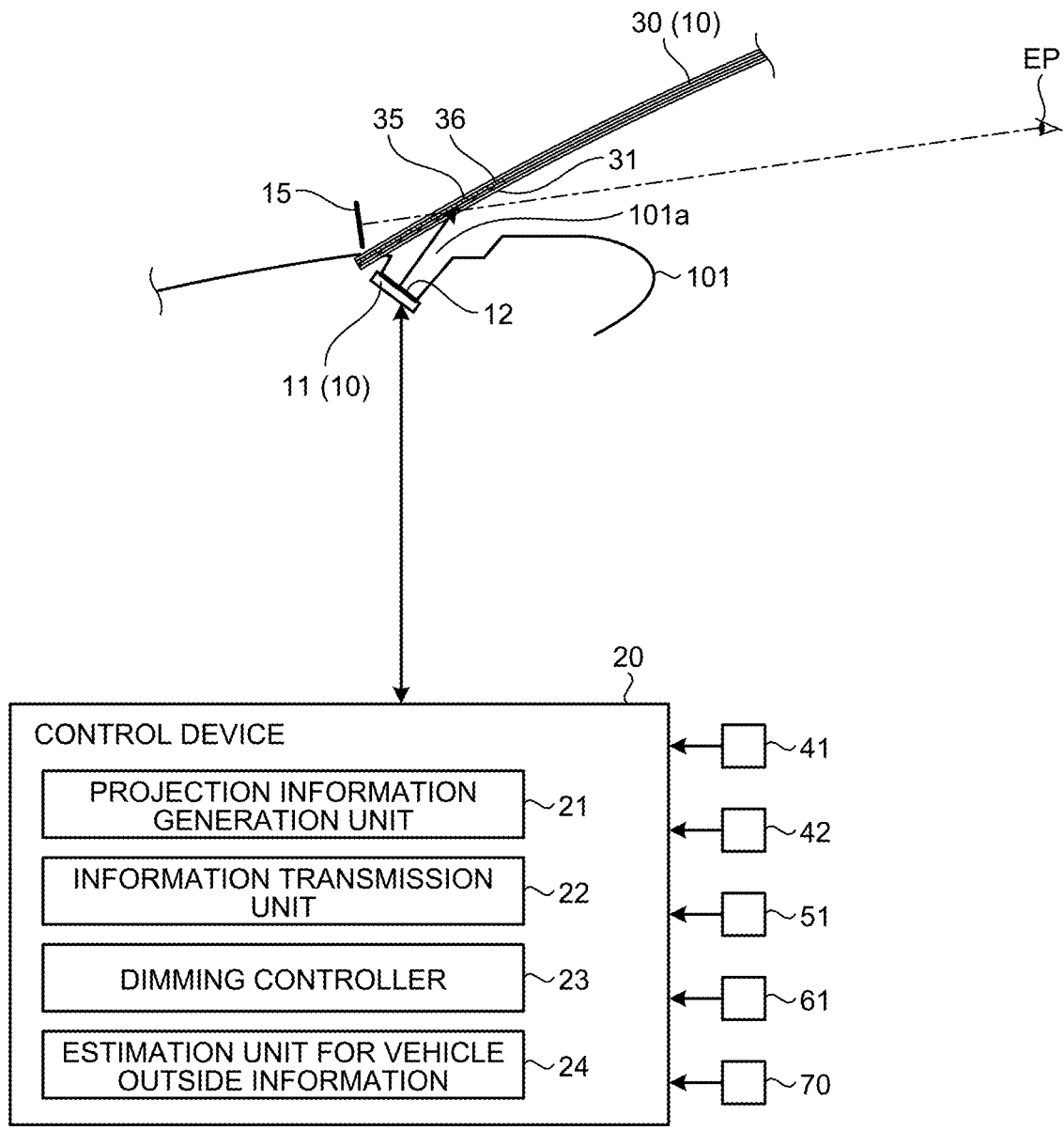
FIG. 9 is a diagram for explaining a configuration example of a vehicle interior display system according to a fourth modification.

In the second modification described above, the dimming films 35A$_n$ having different sizes are overlapped with each other to configure the present system so that the number of laminated films increases toward the lower side of the vehicle. In the vehicle interior display system 1 according to the present modification, such differences in the number of laminated films are made by one dimming film 35B (FIG. 8). The dimming film 35B is formed so that the thickness thereof increases toward the lower side of the vehicle to reduce the light transmittance at a thicker portion. For example, the dimming film 35B may have an inclined surface so that the thickness thereof increases toward the lower side of the vehicle, or may be formed in a stepped shape so that the thickness thereof increases toward the lower side of the vehicle. Herein, exemplified is the dimming film 35B having a stepped shape. A gap formed by a level difference thereof may be filled with the interlayer 30c as a resin sheet, for example.

The exemplified dimming film 35B is formed so that the thickness thereof is varied on the upper side of the vehicle with respect to the projection region 31, and the thickness thereof is not varied in the projection region 31. The dimming film 35B is formed so that the thickness thereof is the largest in the projection region 31. The dimming film 35B is arranged to cover one of, a plurality of, or all of the projection regions 31.

The control device 20 is caused to control the transmittance of the dimming film 35B. In the vehicle interior display system 1, by controlling the transmittance of the dimming film 35B, the projection region 31 is caused to be in the dark state, and the dark state of the projection region 31 gradually varies to be a light state toward the upper side of the vehicle with respect to the projection region 31. That is, on the upper side of the vehicle with respect to the projection region 31, the light transmittance increases toward the upper side of the vehicle. Thus, with the vehicle interior display system 1 according to the present modification, a boundary between the dimming film 35B and the surroundings thereof is inconspicuous in the vehicle vertical direction, and fatigue of the occupant's eyes can be relieved when the vehicle vibrates (for example, vertically moves) during traveling, so that visibility of the information in the display region can be further improved.

Fourth Modification

In the present modification, a light reflection film 36 is arranged in the projection region 31 in the vehicle interior display system 1 according to the embodiment and the first to the third modifications described above (FIGS. 9 to 16). As described later, the light reflection film 36 is arranged to be closer to the vehicle interior side than the dimming film 35 (35A$_n$, 35B).

The light reflection film 36 is a film in which a dielectric multilayer film as an enhanced reflection film is laminated on a metal reflection film, and has a transmission characteristic and a light reflection characteristic like what is called an enhanced reflection mirror, so that the light reflection film 36 transmits the projection light toward the dimming film 35 (35A$_n$, 35B) and reflects a larger amount of light than the transmitted light toward the vehicle interior side. For example, the light reflection film 36 has a reflection characteristic such that a reflectivity is equal to or larger than 20% and the reflectivity is equal to or smaller than 80%. The light reflection film 36 may have any configuration having what is called an enhanced reflection characteristic. For example, the light reflection film 36 is obtained by forming a metal deposition film such as aluminum on a polyethylene terephthalate (PET) film as a base material layer, and laminating a dielectric multilayer film as the enhanced reflection film on the metal deposition film to enhance light reflectivity.

Figure 10:
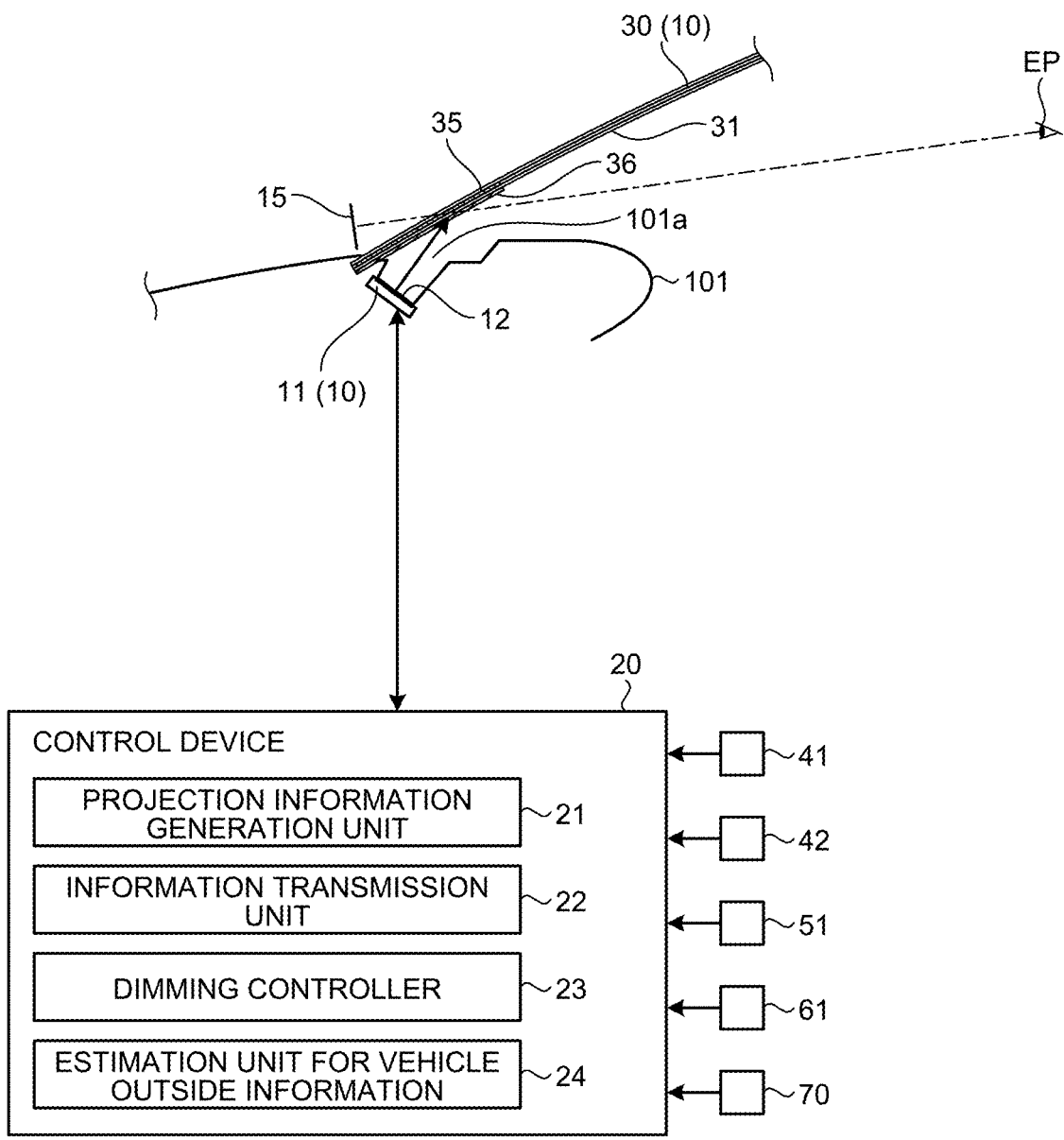
FIG. 10 is a diagram for explaining a variation of the configuration of the vehicle interior display system according to the fourth modification.
Figure 11:
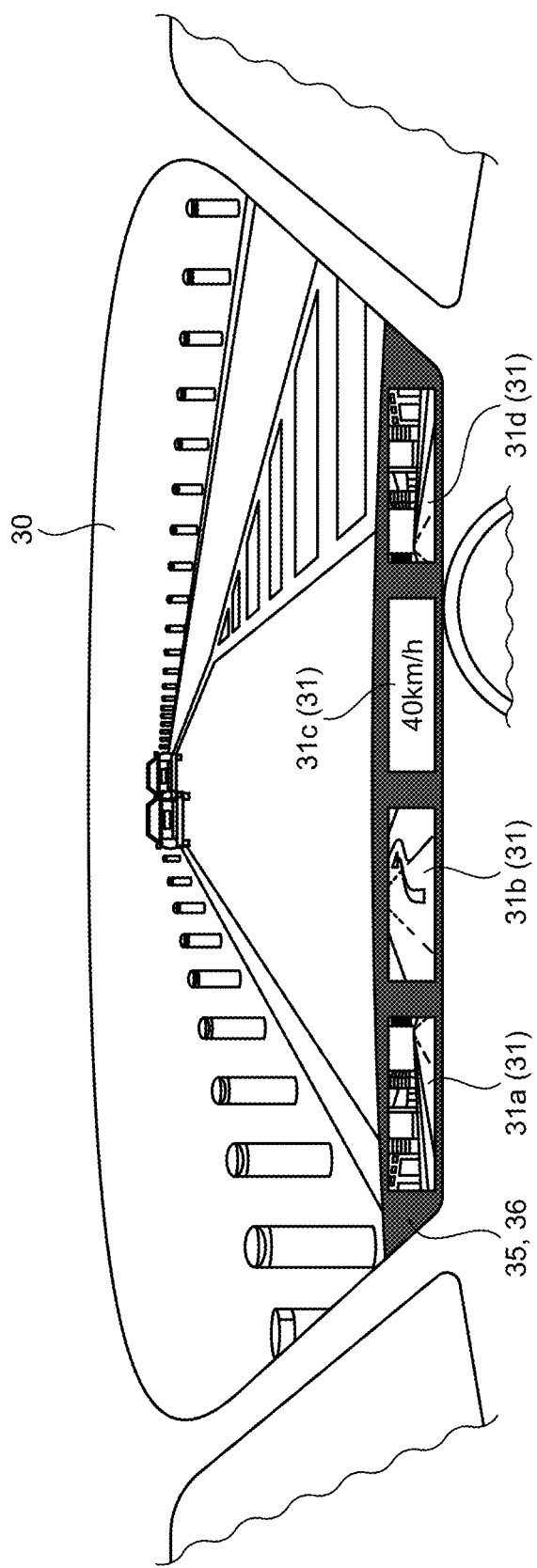
FIG. 11 is a diagram illustrating an example of vehicle interior display according to the fourth modification.

In the vehicle interior display system 1 according to the present modification, the light reflection film 36 may be interposed between the two glass plates 30a and 30b (FIG. 9), or may be attached to the wall surface on the vehicle interior side of the glass plate 30a arranged on the vehicle interior side (FIG. 10). In a specific example described later, the former case is exemplified.

Figure 12:
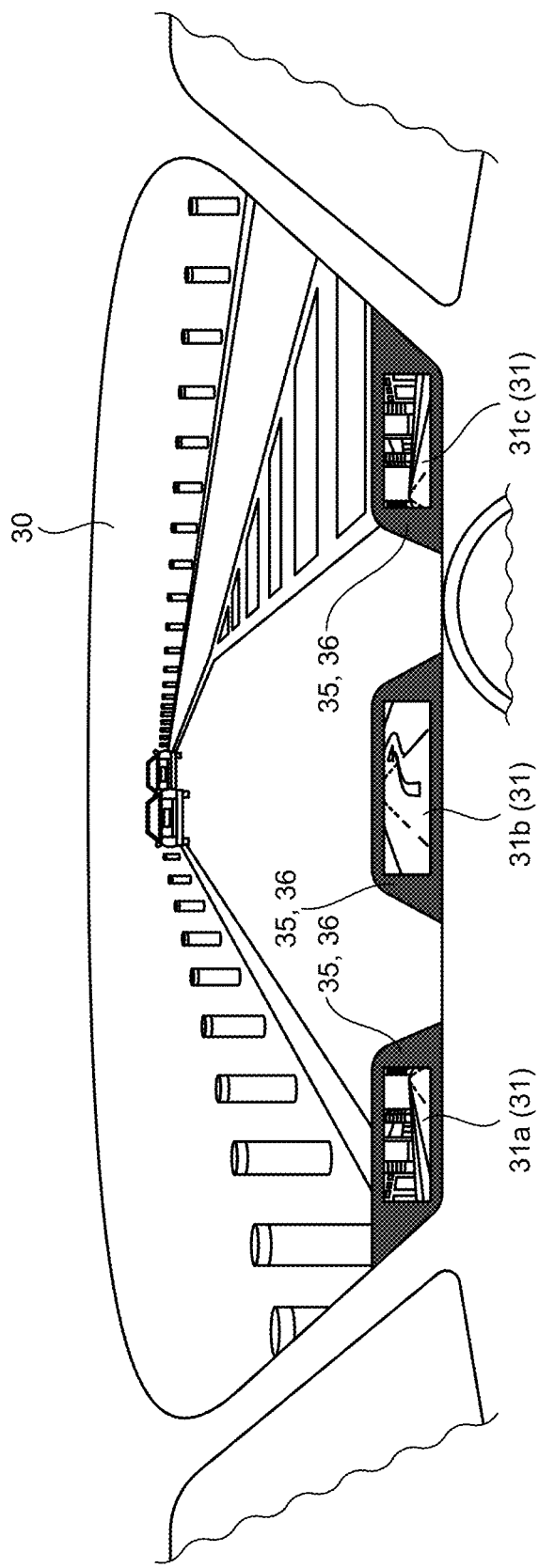
FIG. 12 is a diagram illustrating a variation of the vehicle interior display according to the fourth modification.

In the vehicle interior display system 1 according to the present modification, one light reflection film 36 may be arranged over all the projection regions 31 (the first to the fourth projection regions 31a to 31d) (FIG. 11), or one light reflection film 36 may be arranged for each of the projection regions 31 (the first to the fourth projection regions 31a to 31d) (FIG. 12). Each of the first projection region 31a and the fourth projection region 31d is a projection region to be caused to function as what is called an electronic mirror.

Figure 13:
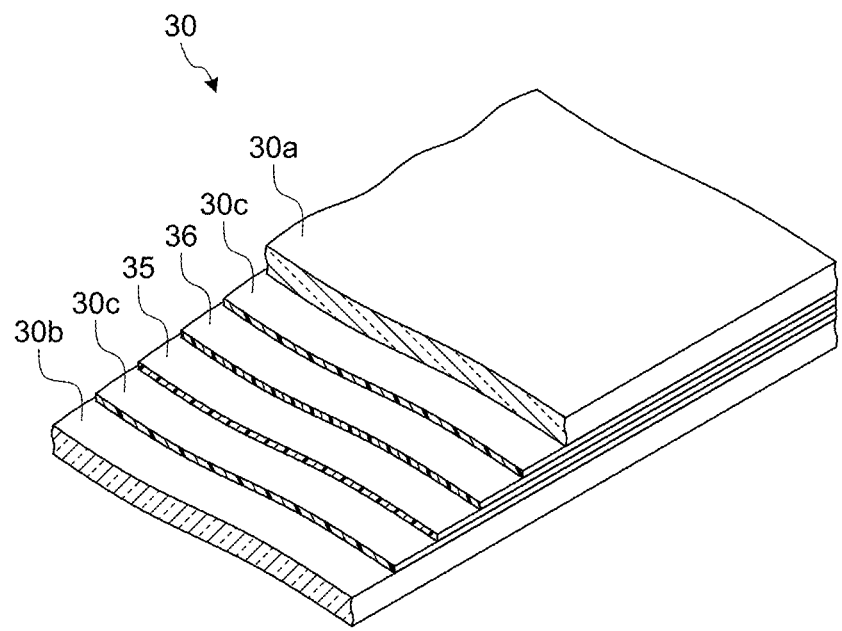
FIG. 13 is a diagram for explaining an example of a transmitting member according to the fourth modification.

In a case of the projection region 31 based on the vehicle interior display system 1 according to the embodiment, the light reflection film 36 is arranged to be closer to the vehicle interior side than the one dimming film 35. Due to this, with the vehicle interior display system 1 according to the present modification, the occupant can visually recognize a bright and clear virtual image as compared with a system in which the light reflection film 36 is arranged to be closer to the vehicle exterior side than the dimming film 35. For example, in this case, the transmitting member 30 according to the present modification is configured as laminated glass obtained by arranging the two interlayers 30c between the two glass plates 30a and 30b, and interposing the dimming film 35 on the vehicle exterior side and interposing the light reflection film 36 on the vehicle interior side, between the two interlayers 30c (FIG. 13).

Figure 14:
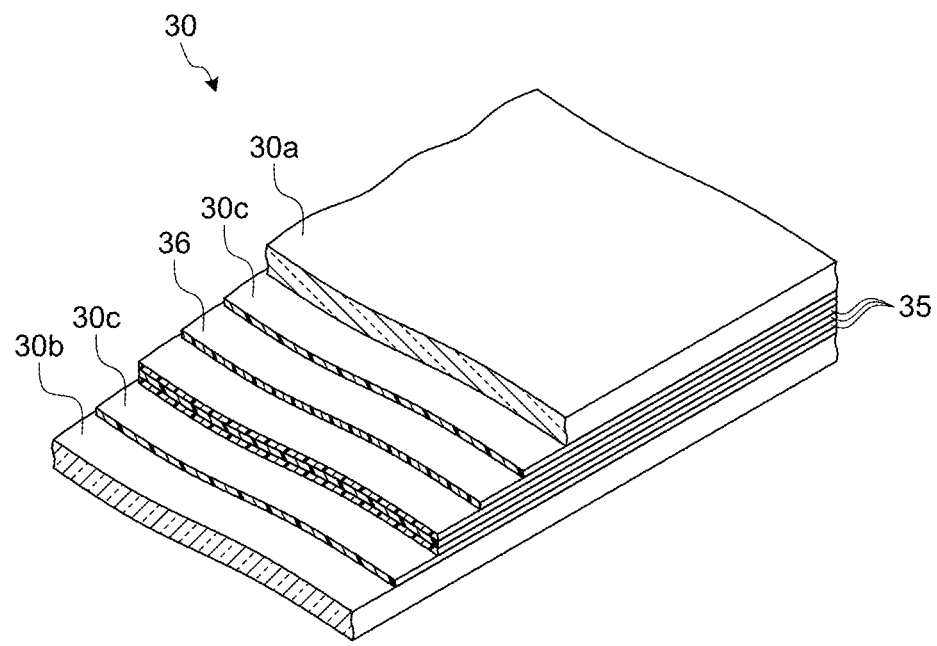
FIG. 14 is a diagram for explaining a variation of the transmitting member according to the fourth modification.

In a case of the projection region 31 based on the vehicle interior display system 1 according to the first modification, the light reflection film 36 is arranged to be closer to the vehicle interior side than the dimming films 35. Due to this, with the vehicle interior display system 1 according to the present modification, the occupant can visually recognize a bright and clear virtual image as compared with a system in which the light reflection film 36 is arranged to be closer to the vehicle exterior side than the dimming films 35. For example, in this case, the transmitting member 30 according to the present modification is configured as laminated glass obtained by arranging the two interlayers 30c between the two glass plates 30a and 30b, and interposing the dimming films 35 on the vehicle exterior side and interposing the light reflection film 36 to be closer to the vehicle interior side than the dimming films 35, between the two interlayers 30c (FIG. 14).

Figure 15:
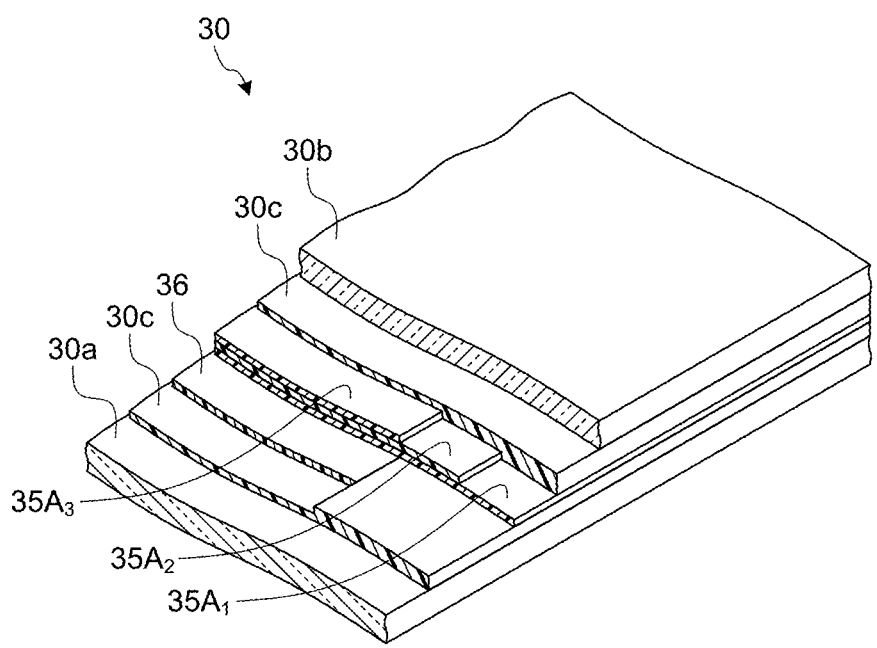
FIG. 15 is a diagram for explaining a variation of the transmitting member according to the fourth modification.

In a case of the projection region 31 based on the vehicle interior display system 1 according to the second modification, the light reflection film 36 is arranged to be closer to the vehicle interior side than the dimming films 35A$_n$ having different sizes. Due to this, with the vehicle interior display system 1 according to the present modification, the occupant can visually recognize a bright and clear virtual image as compared with a system in which the light reflection film 36 is arranged to be closer to the vehicle exterior side than the dimming films $35A_n$. For example, in this case, the transmitting member 30 according to the present modification is configured as laminated glass obtained by arranging the two interlayers 30c between the two glass plates 30a and 30b, and interposing the dimming films $35A_n$ on the vehicle exterior side and interposing the light reflection film 36 to be closer to the vehicle interior side than the dimming films $35A_n$, between the two interlayers 30c (FIG. 15). In this case, for example, the light reflection film 36 is formed to have a size corresponding to the size of the dimming film $35A_3$ that is the smallest so that fatigue of the occupant's eyes can be relieved when the vehicle vibrates (for example, vertically moves) during traveling, and the light reflection film 36 is interposed between the dimming film $35A_1$ on the vehicle interior side and the interlayer 30c on the vehicle interior side to be overlapped with the dimming film $35A_3$.

Figure 16:
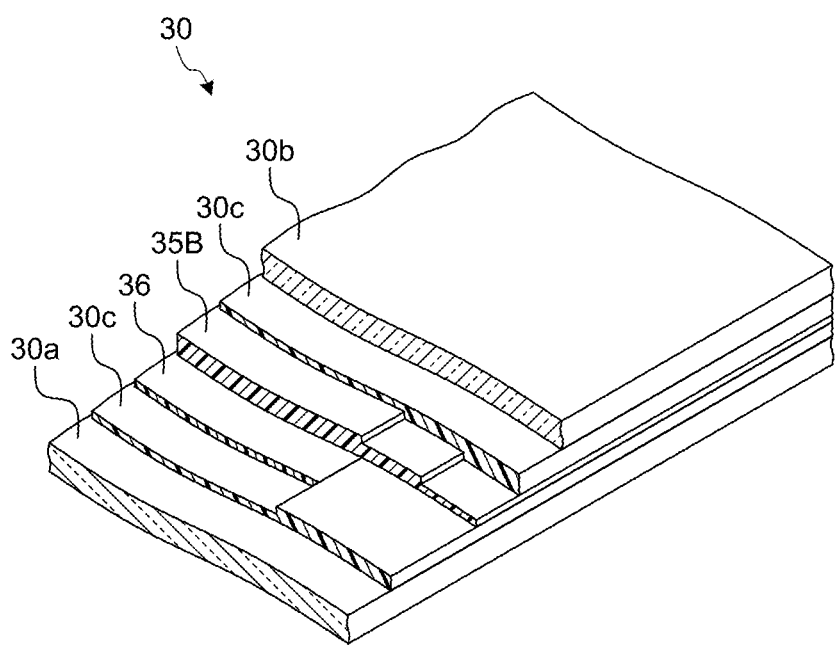
FIG. 16 is a diagram for explaining a variation of the transmitting member according to the fourth modification.

In a case of the projection region 31 based on the vehicle interior display system 1 according to the third modification, the light reflection film 36 is arranged to be closer to the vehicle interior side than the dimming film 35B. Due to this, with the vehicle interior display system 1 according to the present modification, the occupant can visually recognize a bright and clear virtual image as compared with a system in which the light reflection film 36 is arranged to be closer to the vehicle exterior side than the dimming film 35B. For example, in this case, the transmitting member 30 according to the present modification is configured as laminated glass obtained by arranging the two interlayers 30c between the two glass plates 30a and 30b, and interposing the dimming film 35B on the vehicle exterior side and interposing the light reflection film 36 to be closer to the vehicle interior side than the dimming film 35B, between the two interlayers 30c (FIG. 16). In this case, for example, the light reflection film 36 is formed to have a size corresponding to the size of the thickest portion of the dimming film 35B so that fatigue of the occupant's eyes can be relieved when the vehicle vibrates (for example, vertically moves) during traveling, and the light reflection film 36 is interposed between the thickest portion and the interlayer 30c on the vehicle interior side.

In the vehicle interior display system 1 according to the present modification, the light reflection film 36 is interposed between the occupant and the dimming film 35 ($35A_n$, 35B), so that information can be displayed with high luminance comparable to a peripheral environment (brightness, a background, and the like) as compared with the vehicle interior display system 1 according to the embodiment and the first to third modifications. Due to this, the vehicle interior display system 1 according to the present modification can further improve visibility as compared with the vehicle interior display system 1 according to the embodiment and the first to the third modifications. Additionally, with the vehicle interior display system 1 according to the present modification, a high luminance contrast can be achieved between the projection region 31 and the background, so that information can be displayed more precisely as compared with the vehicle interior display system 1 according to the embodiment and the first to the third modifications. Also from this viewpoint, visibility can be improved.

Due to such improvement in visibility, the vehicle interior display system 1 according to the present modification can use the display device 10 having lower luminance than that of the vehicle interior display system 1 according to the embodiment and the first to third modifications. Thus, with the vehicle interior display system 1 according to the present modification, prime cost of the display device 10 can be suppressed as compared with the vehicle interior display system 1 according to the embodiment and the first to the third modifications.

In the vehicle interior display system 1 according to the present modification, one dimming film 35 ($35A_n$, 35B) may be arranged for each of the projection regions 31 (the first to the fourth projection regions 31a to 31d), and one light reflection film 36 may be arranged over all the projection regions 31 (the first to the fourth projection regions 31a to 31d) (not illustrated). In the vehicle interior display system 1 according to the present modification, one light reflection film 36 may be arranged for each of the projection regions 31 (the first to the fourth projection regions 31a to 31d), and one dimming film 35 ($35A_n$, 35B) may be arranged over all the projection regions 31 (the first to the fourth projection regions 31a to 31d) (not illustrated).

Additionally, in the vehicle interior display system 1 according to the present modification, one dimming film 35 ($35A_n$, 35B) may be arranged for each of the projection regions 31 (the first to the fourth projection regions 31a to 31d), one light reflection film 36 may be arranged over all the projection regions 31 (the first to the fourth projection regions 31a to 31d), and a portion between adjacent regions among the projection regions 31 (the first to the fourth projection regions 31a to 31d) may be set as another projection region (not illustrated). In this vehicle interior display system 1, a transmittance fixed film (not illustrated) may be arranged in the other projection region, the transmittance of the transmittance fixed film being fixed to one value in a range from 0% to 100%. In the other projection region, the transmittance fixed film is arranged to be closer to the vehicle exterior side than the light reflection film 36. That is, the vehicle interior display system 1 includes the projection regions 31 (the first to the fourth projection regions 31a to 31d) in which the dimming film 35 ($35A_n$, 35B) is overlapped with the light reflection film 36, and one or a plurality of other projection regions in which the transmittance fixed film is overlapped with the light reflection film 36. With the vehicle interior display system 1, information can be displayed with high luminance comparable to the peripheral environment (brightness, a background, and the like) in the other projection region, and a high luminance contrast can be achieved between the other projection region and the background. Accordingly, the vehicle interior display system 1 can improve visibility.

The vehicle interior display system according to the present embodiment varies the transmittance of the dimming film depending on the brightness outside the vehicle so that the projection information in the display region is visible to the occupant in the vehicle compartment. Accordingly, the vehicle interior display system can improve visibility of the information (projection information) in the display region.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A vehicle interior display system comprising:
a display device configured to project projection light of projection information, and display the projection information in at least one display region arranged at a position that is visible from the inside of a vehicle compartment; and a control device configured to control the display device, and cause the display device to project the projection light, wherein a dimming film configured to vary light transmittance depending on a voltage value of applied voltage is arranged in the display region or a projection region of a transmitting member for the projection light that is present ahead of a line of sight of an occupant who directs toward the display region in the vehicle compartment, the control device includes an estimation unit for vehicle outside information configured to receive an imaging information that is an information that images a vehicle traveling direction from a detection device for vehicle outside information imaging in the vehicle traveling direction, calculate a luminance value of each pixel from the imaging information, and the control device includes a dimming controller configured to calculate a target transmittance of the dimming film based on the luminance value calculated by the estimation unit, and vary transmittance of the dimming film to the target transmittance so that the projection information displayed in the display region is visible to the occupant in the vehicle compartment.

2. The vehicle interior display system according to claim 1, further comprising:

the detection device for vehicle outside information imaging in a vehicle traveling direction, the detection device is in electrical communication with the control device.

3. The vehicle interior display system according to claim 1, wherein the transmitting member is a window glass of the vehicle.

4. The vehicle interior display system according to claim 2, wherein the transmitting member is a window glass of the vehicle.

5. The vehicle interior display system according to claim 1, wherein the transmitting member is a windshield of the vehicle.

6. The vehicle interior display system according to claim 2, wherein the transmitting member is a windshield of the vehicle.

7. The vehicle interior display system according to claim 1, wherein, in the projection region, a plurality of the dimming films having the same size are arranged to be overlapped with each other, or a plurality of the dimming films having different sizes are arranged to be overlapped with each other so that the number of laminated films increases toward a lower side of the vehicle.

8. The vehicle interior display system according to claim 2, wherein, in the projection region, a plurality of the dimming films having the same size are arranged to be overlapped with each other, or a plurality of the dimming films having different sizes are arranged to be overlapped with each other so that the number of laminated films increases toward a lower side of the vehicle.

9. The vehicle interior display system according to claim 3, wherein, in the projection region, a plurality of the dimming films having the same size are arranged to be overlapped with each other, or a plurality of the dimming films having different sizes are arranged to be overlapped with each other so that the number of laminated films increases toward a lower side of the vehicle.

10. The vehicle interior display system according to claim 5, wherein, in the projection region, a plurality of the dimming films having the same size are arranged to be overlapped with each other, or a plurality of the dimming films having different sizes are arranged to be overlapped with each other so that the number of laminated films increases toward a lower side of the vehicle.

11. The vehicle interior display system according to claim 1, wherein the dimming film is formed so that a thickness of the dimming film increases toward a lower side of the vehicle.

12. The vehicle interior display system according to claim 2, wherein the dimming film is formed so that a thickness of the dimming film increases toward a lower side of the vehicle.

13. The vehicle interior display system according to claim 3, wherein the dimming film is formed so that a thickness of the dimming film increases toward a lower side of the vehicle.

14. The vehicle interior display system according to claim 5, wherein the dimming film is formed so that a thickness of the dimming film increases toward a lower side of the vehicle.

15. The vehicle interior display system according to claim 1, wherein a light reflection film is arranged to be closer to a vehicle interior side than the dimming film in the projection region, the light reflection film in which a dielectric multilayer film as an enhanced reflection film is laminated on a metal reflection film.

16. The vehicle interior display system according to claim 2, wherein a light reflection film is arranged to be closer to a vehicle interior side than the dimming film in the projection region, the light reflection film in which a dielectric multilayer film as an enhanced reflection film is laminated on a metal reflection film.

17. The vehicle interior display system according to claim 3, wherein a light reflection film is arranged to be closer to a vehicle interior side than the dimming film in the projection region, the light reflection film in which a dielectric multilayer film as an enhanced reflection film is laminated on a metal reflection film.

18. The vehicle interior display system according to claim 5, wherein a light reflection film is arranged to be closer to a vehicle interior side than the dimming film in the projection region, the light reflection film in which a dielectric multilayer film as an enhanced reflection film is laminated on a metal reflection film.

19. The vehicle interior display system according to claim 7, wherein a light reflection film is arranged to be closer to a vehicle interior side than the dimming film in the projection region, the light reflection film in which a dielectric multilayer film as an enhanced reflection film is laminated on a metal reflection film.

20. The vehicle interior display system according to claim 15, wherein the light reflection film transmits the projection light toward the dimming film, and reflects a larger amount of light than the transmitted light toward a vehicle interior side.

* * * * *